United States Patent
Wang (10) Patent No.: US 12,412,999 B2
(45) Date of Patent: Sep. 9, 2025

(54) STORAGE BATTERY BOLT TERMINAL

(71) Applicant: Changchun Jetty Automotive Technology Co., Ltd., Changchun (CN)

(72) Inventor: Chao Wang, Changchun (CN)

(73) Assignee: CHANGCHUN JETTY AUTOMOTIVE TECHNOLOGY CO., LTD., Changchun (CN)

( * ) Notice: Subject to any disclaimer, the term of this patent is extended or adjusted under 35 U.S.C. 154(b) by 249 days.

(21) Appl. No.: 18/012,390

(22) PCT Filed: Jun. 25, 2021

(86) PCT No.: PCT/CN2021/102279
§ 371 (c)(1),
(2) Date: Dec. 22, 2022

(87) PCT Pub. No.: WO2022/022184
PCT Pub. Date: Feb. 3, 2022

(65) Prior Publication Data
US 2023/0268677 A1 Aug. 24, 2023

(30) Foreign Application Priority Data

Jul. 31, 2020 (CN) .......................... 202021561663.8

(51) Int. Cl.
*H01R 11/28* (2006.01)
(52) U.S. Cl.
CPC .......... *H01R 11/282* (2013.01); *H01R 11/284* (2013.01)
(58) Field of Classification Search
CPC .. H01R 11/282; H01R 11/284; H01R 13/447; H01R 4/28; H01R 4/70; H01M 50/50; H01M 50/567; Y02E 60/10
See application file for complete search history.

(56) References Cited

U.S. PATENT DOCUMENTS

| 3,568,139 A | 3/1971 | Delzer |
| 7,344,421 B1 * | 3/2008 | Spencer ............... H01R 11/287 439/286 |

(Continued)

FOREIGN PATENT DOCUMENTS

| CN | 2343683 Y | 10/1999 |
| CN | 202121006 U | 1/2012 |

(Continued)

OTHER PUBLICATIONS

International Search Report from corresponding International Application No. PCT/CN2021/102279, dated Sep. 27, 2021, 6 pages with translation.

(Continued)

*Primary Examiner* — Jean F Duverne
(74) *Attorney, Agent, or Firm* — Tucker Ellis, LLP (57) ABSTRACT

A storage battery bolt terminal, related to the technical field of automobile electric appliance connection including a terminal (100), which includes a storage battery post connecting unit (101). Compressible units (102) are provided on two sides of an opening end of the storage battery post connecting unit (101). A cable connecting unit (104) is provided in another opening end of the storage battery post connecting unit (101). The storage battery bolt terminal further includes a gland (200) with a pressing unit (201), and one side of the gland (200) is provided with a rotating unit (202), wherein the compressible unit (102) is rotatably connected to the rotating unit (202), and the rotating unit (202) is provided with a locking unit (203). The storage battery bolt terminal is convenient to operate and high in working efficiency, tool-free disassembly and assembly are achieved on the connection of the storage battery post, a bolt tightening tool is omitted, the application is flexible, and the mounting cost is reduced.

11 Claims, 7 Drawing Sheets

(56) References Cited

U.S. PATENT DOCUMENTS

| | | | |
|---|---|---|---|
| 9,559,444 | B1 | 1/2017 | Gisoldi |
| 2004/0161980 | A1 | 8/2004 | Cret |
| 2009/0124118 | A1* | 5/2009 | Magno, Jr. ........... H01R 11/282 439/772 |
| 2009/0253312 | A1 | 10/2009 | Detter et al. |
| 2013/0316599 | A1* | 11/2013 | Goldschmidt ....... H01R 11/282 439/782 |
| 2023/0268677 | A1 | 8/2023 | Wang |

FOREIGN PATENT DOCUMENTS

| | | |
|---|---|---|
| CN | 103001066 A | 3/2013 |
| CN | 203839536 U | 9/2014 |
| CN | 203967374 U | 11/2014 |
| CN | 208433537 U | 1/2019 |
| CN | 208539134 U | 2/2019 |
| CN | 210027289 U | 2/2020 |
| CN | 212626084 U | 2/2021 |
| DE | 102005049957 A1 | 2/2007 |
| EP | 0466528 A1 | 1/1992 |
| EP | 4191795 B1 | 6/2023 |
| FR | 2600830 A1 | 12/1987 |
| FR | 2601515 A1 | 1/1988 |
| JP | S6263625 A | 3/1987 |
| JP | S62124859 A | 6/1987 |
| JP | H10223200 A | 8/1998 |
| JP | 2017059338 A | 3/2017 |
| JP | 2018063781 A | 4/2018 |
| KR | 200443839 Y1 | 3/2009 |
| KR | 20090006548 U | 7/2009 |
| KR | 101984684 B1 | 5/2019 |
| WO | 2022022184 A1 | 2/2022 |

OTHER PUBLICATIONS

Extended European Search Report from corresponding European Application No. 21851326.5 mailed on Feb. 7, 2024, 10 pages.
Office action from corresponding Japanese Application No. 2023-506007 mailed on Feb. 21, 2024, 12 pages with translation.
Brazilian Office Communication dated Apr. 11, 2025 for Application Serial No. BR112022026960-9 (8 pages).
Korean Office Communication dated Apr. 15, 2025 for Application Serial No. 10-2022-7043501 (16 pages).
European Search report dated Jan. 26, 2024 for Publication No. EP4191795A4 (2 pages).
Canadian Office Action dated Jul. 8, 2025 for Application Serial No. 3,182,209 (6 pages).

* cited by examiner

STORAGE BATTERY BOLT TERMINAL

CROSS-REFERENCE TO RELATED APPLICATIONS

The present disclosure is a National State of International Application No. PCT/CN2021/102279, filed Jun. 25, 2021, which claims priority to Chinese Patent Application No. 202021561663.8, filed on Jul. 31, 2020, and entitled "storage battery bolt terminal", which are hereby incorporated by reference in their entireties.

TECHNICAL FIELD

The present disclosure relates to a technical field of automobile electric appliance connection, and particularly to a quick replaceable storage battery bolt connection terminal.

BACKGROUND

The automobile storage battery bolt terminal is an indispensable component for connecting the automotive wiring harness to the storage battery and is necessary for every automobile. The important function of the automobile storage battery bolt terminal is to achieve the connection between the wiring harness of the whole vehicle and the storage battery, so that the electric functions of the whole vehicle can be normal. It is necessary to mount the storage battery bolt reliably, safely and conveniently. The existing storage battery bolt terminal is firstly disposed to sleeve a storage battery post and then is tightened and secured with a bolt, or when the storage battery bolt terminal needs to be disassembled to cut off the power supply in case of maintenance or transportation of the whole vehicle, the operation must be completed with a tool, which is very inconvenient and there is a safety risk in the hot-line works during maintenance.

SUMMARY

Aiming at the defects in the prior art, the problem to be solved herein is to provide a storage battery bolt terminal which is convenient and achieves tool-free disassembly and assembly, so as to overcome the technical defect caused by the fact that the existing storage battery bolt terminal needs to be operated by a bolt tightening tool during disassembly and assembly.

The present disclosure adopts the following technical solution to solve the technical problem: there is provided a storage battery bolt terminal, including: a terminal including a storage battery post connecting unit, compressible units being provided on two sides of an opening end of the storage battery post connecting unit and a cable connecting unit being provided in another opening end of the storage battery post connecting unit; and a gland including a pressing unit and two rotating units provided on the pressing unit (201), wherein the compressible unit is rotatably connected to the rotating unit, and the rotating unit is provided with a locking unit. The storage battery post connecting unit is connected to a storage battery post, with a conical shape matched with that of the storage battery post, and a size matched with that of the storage battery post, and may be matched with and connected to the anode and the cathode of the storage battery as required.

A further solution of the present disclosure is that the gland is externally provided with a protective cover adapted to the pressing unit, and the protective cover is fixedly connected to the gland by clamping. The protective cover includes a main unit and a clamping unit, and the main unit of the protective cover is of rectangular shape, or may be of any circular or polygonal shape as long as it is matched with the pressing unit. The function of the clamping unit is to clamp the gland without loosening or falling off. There may be one clamping unit at the top and the bottom, respectively, or the number of the clamping units may also be three, four, five, etc.

A further solution of the present disclosure is that when the gland is rotated to the above of the terminal, the locking unit locks the terminal with a storage battery post by compressing the compressible unit. During disassembly of the storage battery bolt terminal, the locking unit can be released from the compressible unit once the protective cover is raised by hand, thus realizing the disassembly between the storage battery bolt terminal and the storage battery post, which is very convenient and quick. The storage battery post connecting unit is connected to the storage battery post and matched with the shape thereof.

A further solution of the present disclosure is that a stop unit is provided outside the compressible unit, and when the gland is rotated, the rotating unit abuts against the stop unit to form a limiting fit between the stop unit and the rotating unit. When the protective cover and the gland are rotated to a certain degree, the rotation of the gland stops. At the same time, the storage battery post connecting unit is connected to the storage battery post.

A further solution of the present disclosure is that the protective cover is made of a flame retardant hard material. Different types of materials, such as PBT-GF30, PA6, PA66, PC/ABS, etc., are selected for the protective cover depending on strengths, temperature-resistant grades, and material characteristics, and any material should meet the requirements of flame retardance and strength.

A further solution of the present disclosure is that the terminal is integrally formed.

A further solution of the present disclosure is that the gland is integrally formed.

The terminal and the gland are both integrally formed, ensuring that the storage battery bolt terminal is firmer. Different types of materials, such as red copper, brass, lead brass, etc., may be selected for the terminal depending on the machining process, electrical conductivity and material characteristics. The surface of the terminal is plated with tin, silver, nickel, etc. depending on the environmental requirements, thus meeting the requirements of electrical conductivity and corrosion resistance. The gland may be made of red copper, brass, lead brass, carbon steel, low-carbon steel, stainless steel, etc. depending on the machining process. In order to meet the requirement of corrosion resistance, the surface of the copper-containing material may be plated with tin, silver and nickel depending on environmental requirements, and the surface of the carbon steel may be plated with zinc, zinc-nickel alloy, etc.

A further solution of the present disclosure is that the pressing unit is of any circular or polygonal shape.

A further solution of the present disclosure is that the pressing unit is of rectangular shape.

The pressing unit is clamped and matched with the protective cover, and the pressing unit may be pressed and raised in a process of pressing and raising the protective cover.

A further solution of the present disclosure is that the cable connecting unit includes at least one wiring hole, and a direction of the wiring hole may be 0° to 180° according to an outgoing line direction.

A further solution of the present disclosure is that the cable connecting unit is connected to the cable by crimping, welding or screwing.

The cable connecting unit is connected to the cable, and has a shape that matches the profile of the wire. An alternative profile of the cable connecting unit is a circular or any polygonal shape. According to the connection mode and requirement of the cable, crimping, welding or screwing may be adopted. Depending on the number of the cables to be connected, the cable connecting unit may have one, two or three wiring holes, etc. Depending on the outgoing line direction, the opening direction of the wiring holes may be 0° to 180°.

A further solution of the present disclosure is that the compressible unit is hinged to the rotating unit by a rotating shaft. The rotating shaft connects the terminal and the gland to play roles of connection and rotation. The rotating shaft includes a central shaft cap unit, a central shaft unit and a plug unit, wherein the central shaft cap unit is of circular shape to prevent the rotating shaft from falling off, and an alternative profile is of circular or polygonal shape such as ellipse shape, square shape, etc. The central shaft unit is of cylindrical shape to play roles of connection and rotation. The plug unit is of concave circular shape to prevent the gland and the terminal from falling off.

The present disclosure has the following advantageous effects.

1. By using the storage battery bolt terminal, the disconnection and connection of the storage battery bolt terminal can be realized by simple manual operations, and assembly or disassembly of the storage battery bolt terminal and the storage battery post can be achieved by pressing or raising the protective cover, so that the bolt tightening tool is omitted, the maintenance convenience is greatly improved, the structure is simple and practical, the manufacturing process is simple, and the mounting cost is reduced, thus having outstanding practical values.
2. In the storage battery bolt terminal, the protective cover is connected to the gland by clamping, and the protection cover has a flame retardant and insulating performance. During maintenance, the storage battery bolt can be disconnected by simple manual operation, and there is no safety risk when pressing and raising the protection cover by hand, so the safety is greatly improved.
3. The cable connecting unit is connected to the cable by welding, crimping and screwing. A connection in any direction of 0° to 180° can be realized depending on the outgoing line direction, thus achieving different connection modes and more flexible applications.

BRIEF DESCRIPTION OF THE DRAWINGS

The present disclosure will be further described below with reference to the drawings and the embodiments. In the drawings.

FIG. 1-1 is a diagram of a semi-closed state of a gland of a storage battery bolt terminal according to the present disclosure;

FIG. 1-2 is a diagram of a closed state of a gland of a storage battery bolt terminal according to the present disclosure;

FIGS. 2, 2-1 and 2-2 are three-dimensional structural diagrams of a gland according to the present disclosure;

FIGS. 3 and 3-1 to 3-6 are three-dimensional structural diagrams of a terminal according to the present disclosure;

FIGS. 4 and 4-1 are structural diagrams of a protective cover according to the present disclosure;

FIGS. 6-1 and 6-2 are screwing structural diagrams of a cable connecting unit according to the present disclosure;

FIGS. 7-1, 7-2 and 7-3 are diagrams of an open state, a semi-compressed state, and a locked state of a terminal according to the present disclosure, respectively.

FIG. 8-1 illustrates, from left to right, outgoing line directions of 0°, 45°, 90°, 135° and 180° on a YZ plane; and FIG. 8-2 illustrates, from left to right, outgoing line directions of 0°, 45°, 90°, 135° and 180° on an XY plane.

REFERENCE NUMERALS

100: terminal;
200: gland;
300: protective cover;
400: rotating shaft;
101: storage battery post connecting unit;
102: compressible unit;
103: stop unit;
104: cable connecting unit;
201: pressing unit;
202: rotating unit;
203: locking unit;
301: main unit;
302: clamping unit;
401: shaft cap unit;
402: central shaft unit;
403: plug unit.

DETAILED DESCRIPTION

Exemplary embodiments of the present disclosure will now be described in detail with reference to the drawings.

Embodiments of the First Aspect

As illustrated in FIGS. 1 to 5, a storage battery bolt terminal according to an embodiment of the present disclosure includes a terminal 100 including a storage battery post connecting unit 101, compressible units 102 being provided on two sides of an opening end of the storage battery bolt connecting unit 101, and a cable connecting unit 104 being provided in another opening end of the storage battery post connecting unit 101. The storage battery bolt terminal further includes a gland 200, which includes a pressing unit 201 and two rotating units 202 provided on the pressing unit 201.

Figure 1:
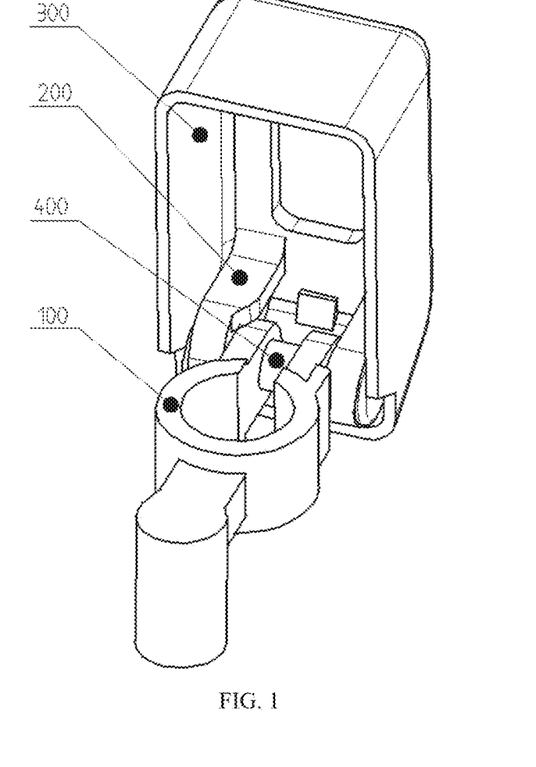
FIG. 1 is a three-dimensional structural diagram of a storage battery bolt terminal according to the present disclosure.
Figure 2:
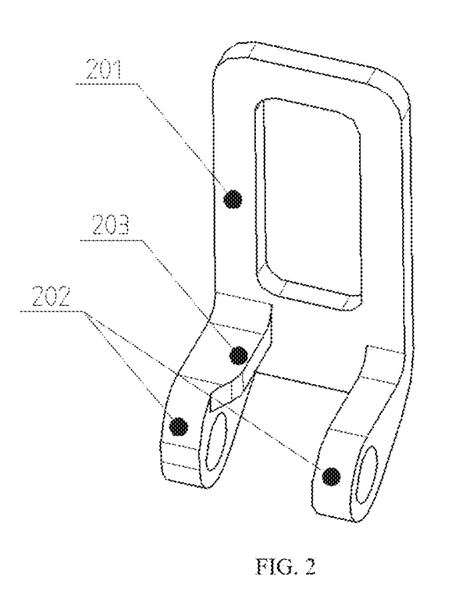
Figure 3:
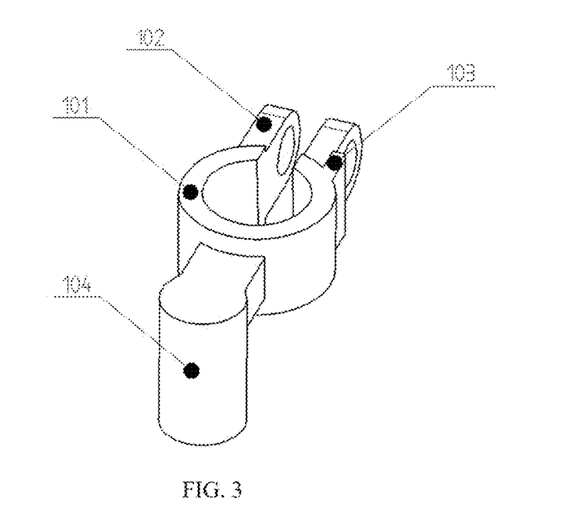

The compressible unit 102 is rotatably connected to the rotating unit 202, and the rotating unit 202 is provided with a locking unit 203. The storage battery post connecting unit 101 is connected to a storage battery post, with a conical shape matched with that of the storage battery post, and a size matched with and greater than that of the storage battery post.

Further, in order to protect the safety of workers and prevent the workers from directly touching the gland, the gland 200 is externally provided with a protective cover 300 adapted to the pressing unit 201.

Figure 4:
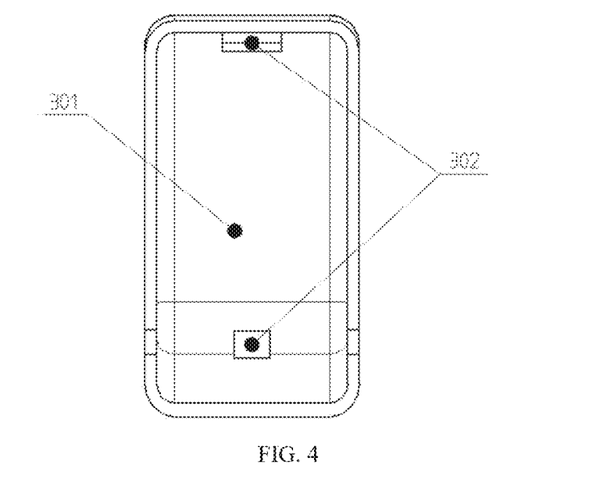

In some implementations, the protective cover 300 is fixedly connected to the gland 200 by clamping. As illustrated in FIG. 4, the protective cover includes a main unit 301 and a clamping unit 302, and the main unit of the protective cover 300 is of rectangular shape. As illustrated in FIGS. 2-1, 2-2 and 4-1, the gland 200 is of circular or triangular shape, and the protective cover 300 is of circular shape. It can be understood that the gland is of any circular or polygonal shape, and the protective cover 300 may be of any circular or polygonal shape as long as it is matched with the pressing unit 201. The protective cover 300 should cover the gland 200 to ensure that the gland is not touched by human hands when the storage battery bolt terminal is in operation. The function of the clamping unit 302 is to clamp the gland 200 without loosening or falling off. There may be one clamping unit 302 at the top and the bottom, respectively, or the number of the clamping units 302 may also be three, four, five, etc.

In other implementations, the protective cover 300 and the gland 200 may be connected in other ways, which is not limited herein.

According to the embodiment, the disconnection and connection of the storage battery bolt terminal can be realized by simple manual operations, and assembly or disassembly of the storage battery bolt terminal and the storage battery post can be achieved by pressing or raising the protective cover, so that the bolt tightening tool is omitted, the maintenance convenience is greatly improved, the structure is simple and practical, the manufacturing process is simple, and the mounting cost is reduced, thus having outstanding practical values.

Figure 11:
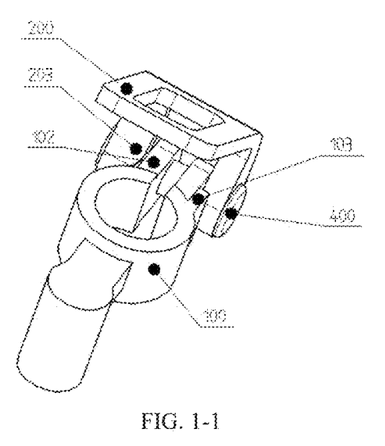
Figure 12:
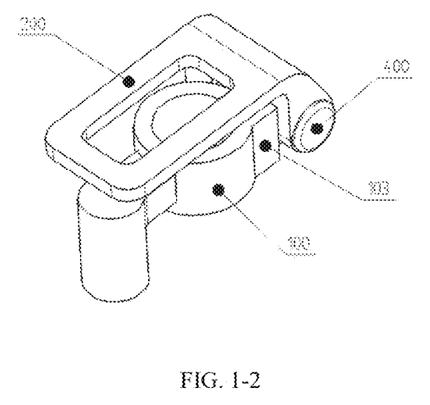

As illustrated in FIGS. 1-1 and 1-2, the storage battery post connecting unit is a sleeve hole structure (e.g., a cylindrical hole), and the sleeve hole of the storage battery post connecting unit is disposed to sleeve the storage battery post, wherein the storage battery post is a conical cylinder.

As illustrated in FIG. 2, the locking unit 203 is provided on one of the rotating units 202. The locking unit 203 is a strip-shaped structure protruding from the rotating unit 202, and a side of the locking unit 203 close to a rotating end of the rotating unit is an inclined surface.

In some implementations, in order to improve the efficiency of the locking unit 203 compressing the compressible unit 102, a position where the locking unit 203 contacts the compressible unit 102 is a transition corner, by which the opening between the compressible units 102 is gradually narrowed by compressing. The transition corner mentioned herein refers to a rounded arc corner.

When the protective cover 300 is rotatably pressed, the gland 200 is rotated toward the terminal 100, and when the gland 200 is rotated to the above of the terminal 100, the locking unit 203 compresses the compressible unit 102 to shrink the opening between the compressible units 102, thus locking the terminal 100 with the storage battery post, and realizing the connection and contact between the storage battery bolt terminal and the storage battery post.

Figure 71:
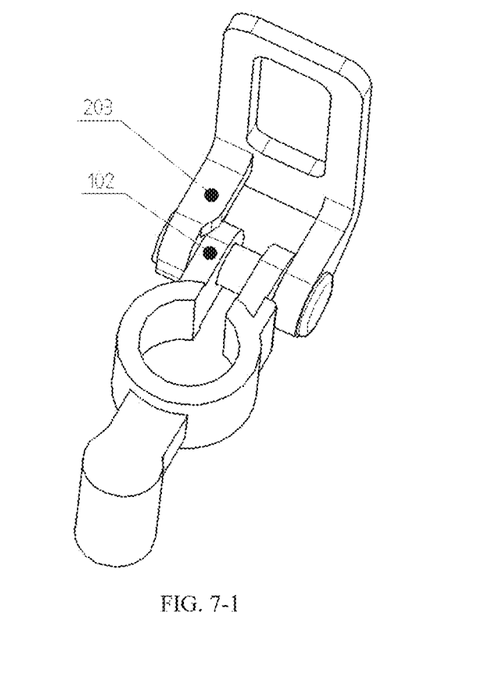
Figure 72:
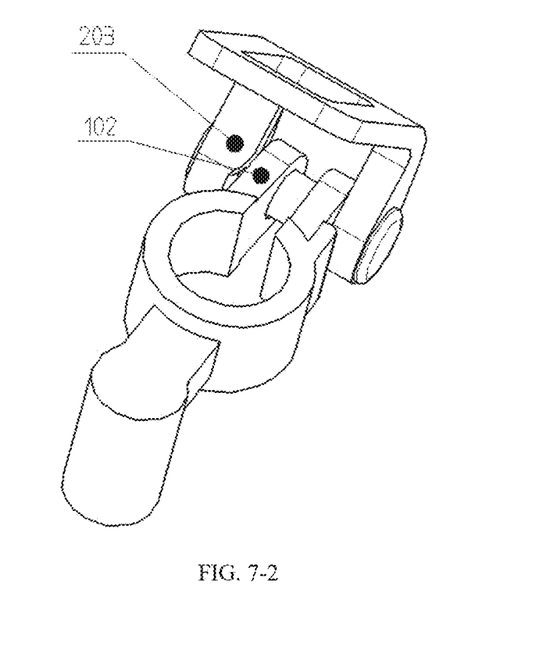
Figure 73:
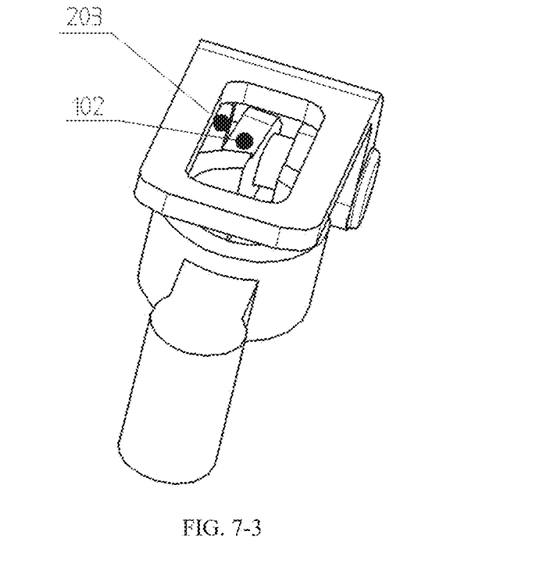

Specifically, as illustrated in FIGS. 7-1 to 7-3, the specific process of connecting the storage battery bolt terminal to the storage battery post includes: firstly, the gland 200 is in an open state, and the locking unit 203 does not compress the compressible unit 102, as illustrated in FIG. 7-1; in this state, the protective cover 300 is rotatably pressed to drive the gland 200 to be rotated towards the terminal 100, the locking unit 203 compresses the compressible unit 102, and the opening between the compressible units 102 shrink; as illustrated in FIG. 7-2, the protective cover 300 is continued to be rotatably pressed to drive the gland 200 to be rotated towards the terminal 100, and the gland 200 drives the locking unit 203 to compress the compressible unit 102 until the protective cover 300 cannot move, thus locking the terminal 100 and the storage battery post.

During disassembly of the storage battery bolt terminal, since the protective cover 300 is clamped with the gland 200, the locking unit 203 can be released from the compressible unit once the protective cover 300 is raised by hand, thus realizing the disassembly between the storage battery bolt terminal and the storage battery post, which is very convenient and quick. The storage battery post connecting unit 101 is connected to the storage battery post and matched with the shape thereof.

In some implementations, a stop unit 103 is provided outside the compressible unit 102, and the stop unit 103 and the locking unit 203 are disposed on opposite sides. During mounting of the storage battery post, the protective cover 300 is pressed to drive the gland 200 to be rotated, so that the rotating unit 202 abuts against the stop unit 103, thus forming a limiting fit between the stop unit 103 and the rotating unit 202. When the protective cover and the gland are rotated to a certain degree, the rotation of the gland 200 stops. At the same time, the storage battery post connecting unit 101 is connected to the storage battery post.

The embodiment can prevent the excessive rotation of the gland, and further avoid the phenomenon that the gland contacts the storage battery post to conduct electricity.

As illustrated in FIG. 4, the protective cover 300 is made of a flame retardant hard material. Different types of materials, such as PBT-GF30, PA6, PA66, PC/ABS, etc., are selected for the protective cover 300 depending on strengths, temperature-resistant grades, and material characteristics, and any material should meet the requirements of flame retardance and strength.

The terminal 100 and the gland 200 are both integrally formed, ensuring that the storage battery bolt terminal is firmer. Different types of materials, such as red copper, brass, lead brass, etc., may be selected for the terminal 100 depending on the machining process, electrical conductivity and material characteristics. The surface of the terminal 100 is plated with tin, silver, nickel, etc. depending on the environmental requirements, thus meeting the requirements of electrical conductivity and corrosion resistance. The gland 200 may be made of red copper, brass, lead brass, carbon steel, low-carbon steel, stainless steel, etc. depending on the machining process. In order to meet the requirement of corrosion resistance, the surface of the copper-containing material may be plated with tin, silver and nickel depending on environmental requirements, and the surface of the carbon steel may be plated with zinc, zinc-nickel alloy, etc.

Figure 21:
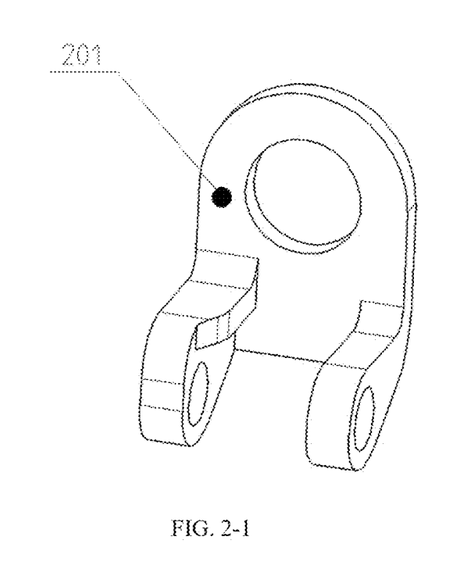
Figure 22:
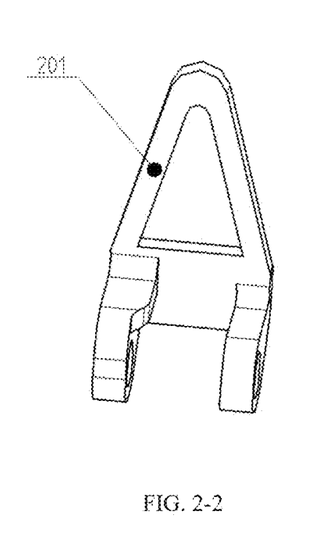
Figure 31:
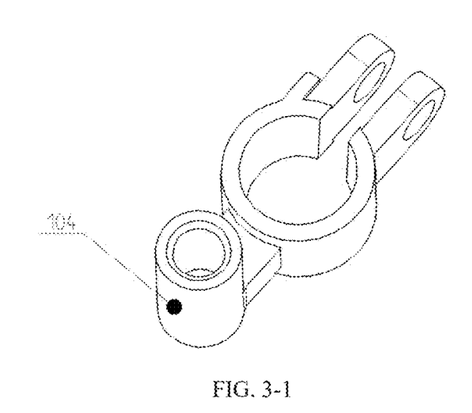
Figure 32:
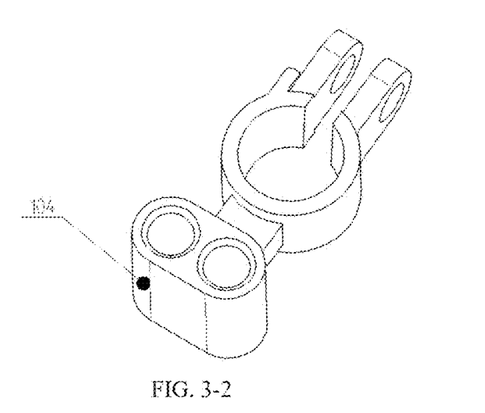
Figure 33:
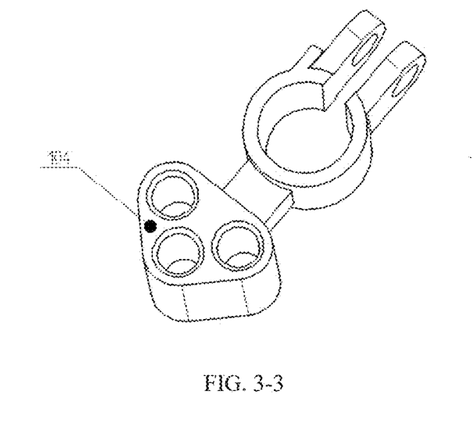
Figure 34:
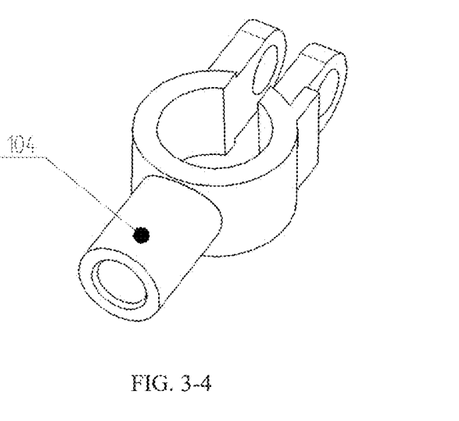
Figure 35:
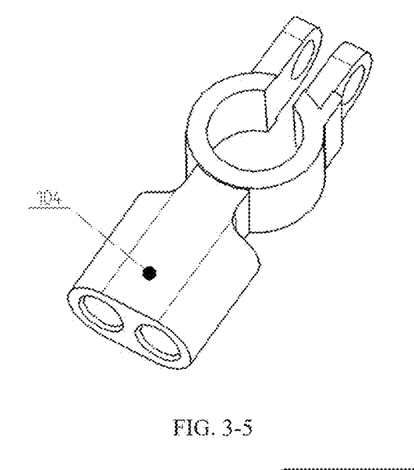
Figure 36:
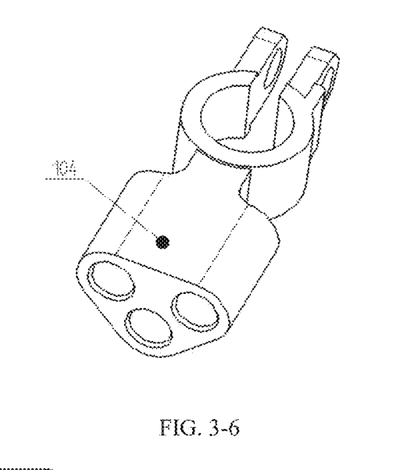

As illustrated in FIGS. 2, 2-1 and 2-2, the structure of the pressing unit 201 may be of any circular or polygonal shape, and exemplarily, the structure of the pressing unit 201 is of rectangular shape. The pressing unit 201 is clamped and matched with the protective cover 300, and the pressing unit 201 may be pressed and raised in the process of pressing and raising the protective cover 300.

As illustrated in FIGS. 3 and 3-1 to 3-6, the cable connecting unit 104 includes at least one wiring hole, and crimping or welding may be adopted according to the connection mode of the cable. According to the outgoing line direction, the direction of the wiring hole of the cable connecting unit 104 may be 0° to 180°. The cable connecting unit 104 is connected to the cable, and has a circular profile that matches the shape of the wire. The alternative profile is a circular or any polygonal shape. According to the connection mode of the cable, crimping or welding may be adopted. Depending on the number of the cables connected, the cable connecting unit 104 may have one, two or three wiring holes, etc. Depending on the outgoing line direction, the opening direction of the wiring holes may be 0° to 180°. FIGS. 3-1 to 3-3 are diagrams of terminal turning, and the opening direction of the wiring hole may be 0° or 180°. As illustrated in FIGS. 3-4 to 3-6, the opening direction of the wiring hole is 90°, and may be adjusted to any direction of 0° to 180° depending on the outgoing line direction.

Figure 81:
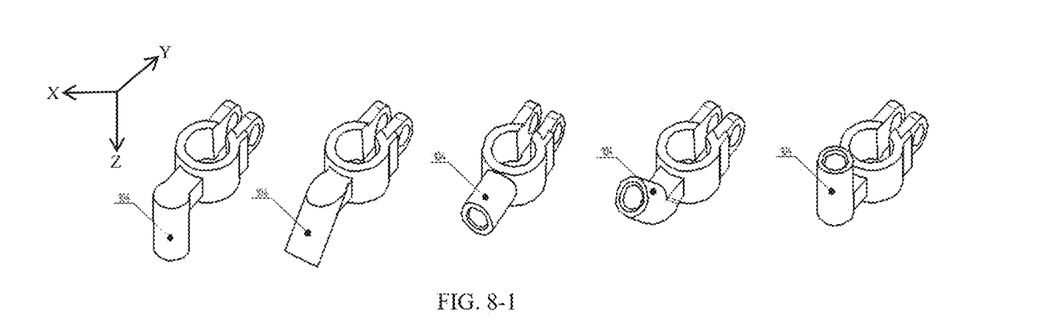
Figure 82:
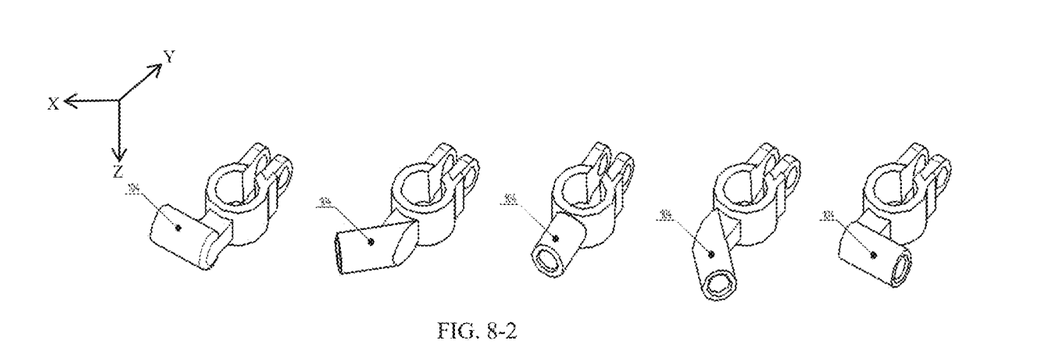

Specifically, the adjustment range of the direction of the wiring hole is 0° to 180° on a vertical plane where the cable connecting unit is located (as illustrated in FIG. 8-1) and/or 0° to 180° on a horizontal plane where the cable connecting unit is located (as illustrated in FIG. 8-2).

Specifically, the vertical plane where the cable connecting unit is located refers to a plane formed by adjustable paths of the cable connecting unit in a vertical direction (abbreviated as a YZ plane), and as illustrated in FIG. 8-1, which illustrates, from left to right, the outgoing line directions of 0°, 45°, 90°, 135° and 180° on the YZ plane.

The horizontal plane where the cable unit is located refers to a plane formed by adjustable paths of the cable in a horizontal direction (abbreviated as an XY plane), and as illustrated in FIG. 8-2, which illustrates, from left to right, the outgoing line directions of 0°, 45°, 90°, 135° and 180° on the XY plane.

Figure 5:
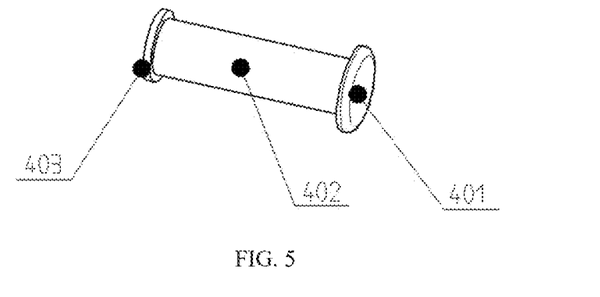
FIG. 5 is a three-dimensional structural diagram of a rotating shaft according to the present disclosure.

In some implementations, as illustrated in FIG. 5, the compressible units 102 are hinged to the rotating units 202 by a rotating shaft 400, and the rotating shaft 400 connects the terminal 100 and the gland 200 to play roles of connection and rotation. The rotating shaft 400 includes a central shaft cap unit 401, a central shaft unit 402 and a plug unit 403, wherein the central shaft cap unit 401 is of circular shape to prevent the rotating shaft from falling off, and the alternative profile is of circular or polygonal shape such as ellipse shape, square shape, etc. The central shaft unit 402 is of cylindrical shape to play roles of connection and rotation. The plug unit 403 is of concave circular shape and is detachably provided on the central shaft unit 402 to prevent the gland 200 and the terminal 100 from falling off.

During implementation, firstly, the plug unit 403 is separated from the central shaft unit 402, and the central shaft unit 402 is enabled to pass through mounting holes of the rotating unit 202 and the compressible unit 102. The plug unit 403 is interference-fitted into the mounting hole of the central shaft unit 402, or screwed into a threaded hole of the central shaft unit 402.

The embodiments have a characteristic of simple structure, which facilitates the mounting of the compressible unit and the rotating unit.

Embodiments of the Second Aspect

As illustrated in FIGS. 1 to 6, the storage battery bolt terminal according to an embodiment includes a terminal 100. The terminal 100 includes a storage battery post connecting unit 101, compressible units 102 provided on two sides of an opening end of the storage battery bolt connecting unit 101, and a cable connecting unit 104 in another opening end of the storage battery post connecting unit 101. The storage battery bolt terminal further includes a gland 200, which includes a pressing unit 201, and two rotating units 202 provided on a side of the gland 200 and on the pressing unit 201.

Figure 41:
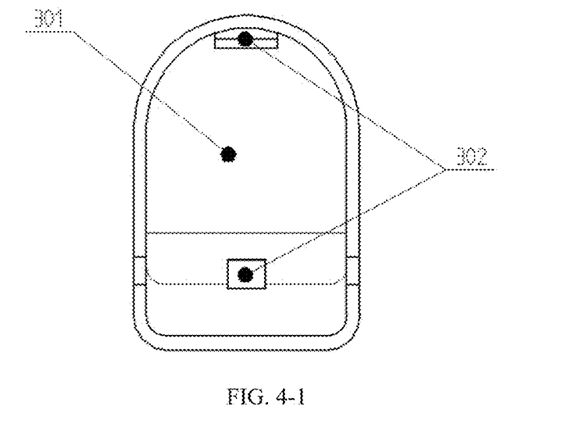

The compressible unit 102 is rotatably connected to the rotating unit 202, and the rotating unit 202 is provided with a locking unit 203. The storage battery post connecting unit 101 is connected to a storage battery post, with a conical shape matched with that of the storage battery post, and a size matched with and greater than that of the storage battery post. The gland 200 is externally provided with a protective cover 300 adapted to the pressing unit 201, and the protective cover 300 is fixedly connected to the gland 200 by clamping. The protective cover includes a main unit 301 and a clamping unit 302, and the main unit of the protective cover 300 is of rectangular shape. As illustrated in FIGS. 2-1, 2-2 and 4-1, the gland 200 is of circular or triangular shape, and the protective cover 300 is of circular shape. It can be understood that the gland is of any round or polygonal shape, and the protective cap 300 may be of any circular or polygonal shape as long as it is matched with the pressing unit 201. The function of the clamping unit 302 is to clamp the gland 200 without loosening or falling off. There may be one clamping unit 302 at the top and the bottom, respectively, or the number of the clamping units 302 may also be three, four, five, etc.

After the storage battery bolt terminal is mounted to sleeve the storage battery post, when the protective cover 300 is rotatably pressed, the gland 200 is rotated to the above of the terminal 100, the locking unit 203 compresses the compressible unit 102 to lock the terminal 100 with the storage battery post. During disassembly of the storage battery bolt terminal, since the protective cover 300 is clamped with the gland 200, the locking unit 203 can be released from the compressible unit once the protective cover 300 is raised by hand, thus realizing the disassembly between the storage battery bolt terminal and the storage battery post, which is very convenient and quick. The storage battery post connecting unit 101 is connected to the storage battery post and matched with the shape thereof. A stop unit 103 is provided outside the compressible unit 102, and the stop unit 103 and the locking unit 203 are disposed on opposite sides. During mounting of the storage battery post, the protective cover 300 is pressed to drive the gland 200 to be rotated, so that the rotating unit 202 abuts against the stop unit 103, thus forming a limiting fit between the stop unit 103 and the rotating unit 202. When the protective cover and the gland are rotated to a certain degree, the rotation of the gland 200 stops. At the same time, the storage battery post connecting unit 101 is connected to the storage battery post.

As illustrated in FIG. 4, the protective cover 300 is made of a flame retardant hard material. Different types of materials, such as PBT-GF30, PA6, PA66, PC/ABS, etc., are selected for the protective cover 300 depending on strengths, temperature-resistant grades, and material characteristics, and any material should meet the requirements of flame retardance and strength.

The terminal 100 and the gland 200 are both integrally formed, ensuring that the storage battery bolt terminal is firmer. Different types of materials, such as red copper, brass, lead brass, etc., may be selected for the terminal 100 depending on the machining process, electrical conductivity and material characteristics. The surface of the terminal 100 is plated with tin, silver, nickel, etc. depending on the environmental requirements, thus meeting the requirements of electrical conductivity and corrosion resistance. The gland 200 may be made of red copper, brass, lead brass, carbon steel, low-carbon steel, stainless steel, etc. depending on the machining process. In order to meet the requirement of corrosion resistance, the surface of the copper-containing material may be plated with tin, silver and nickel depending on environmental requirements, and the surface of the carbon steel may be plated with zinc, zinc-nickel alloy, etc.

As illustrated in FIGS. 2, 2-1 and 2-2, the pressing unit 201 may be of any circular or polygonal shape, and exemplarily, the pressing unit 201 is of rectangular shape. The pressing unit 201 is clamped and matched with the protective cover 300, and the pressing unit 201 may be pressed and raised in the process of pressing and raising the protective cover 300.

Figure 61:
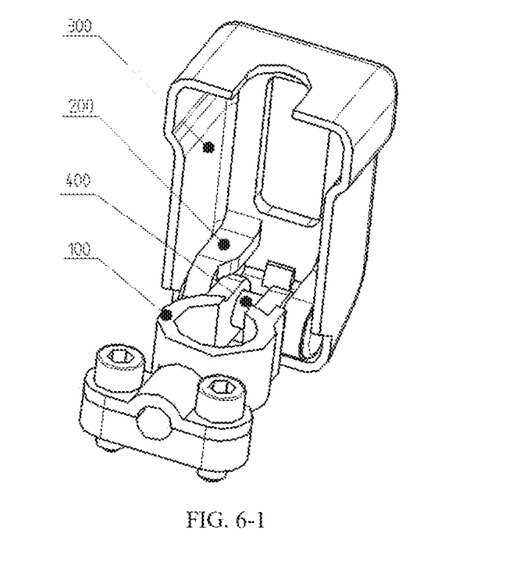
Figure 62:
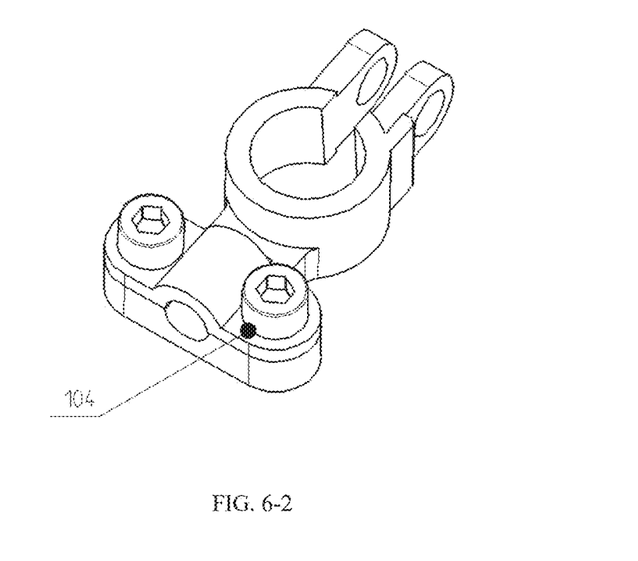

As illustrated in FIGS. 6-1 and 6-2, the cable connecting unit 104 and the cable are connected by screwing. As illustrated in FIG. 5, the compressible unit 102 is hinged to the rotating unit 202 by a rotating shaft 400, which connects the terminal 100 and the gland 200 to play roles of connection and rotation. The rotating shaft 400 includes a central shaft cap unit 401, a central shaft unit 402 and a plug unit 403, wherein the central shaft cap unit 401 is of circular shape to prevent the rotating shaft from falling off, and the alternative profile is of circular or polygonal shape such as ellipse shape, square shape, etc. The central shaft unit 402 is of cylindrical shape to play roles of connection and rotation. The plug unit 403 is of concave circular shape to prevent the gland 200 and the terminal 100 from falling off.

It should be understood that the above embodiments are only used to illustrate the technical solutions of the present disclosure, rather than making limitations thereto. For those skilled in the art, the technical solutions in the above embodiments can be modified, or some technical features thereof can be equivalently replaced, and all these modifications and replacements should fall within the protection scope of the claims of the present disclosure.

What is claimed is:

1. A storage battery bolt terminal, comprising:
   a terminal comprising a storage battery post connecting unit, a first and second compressible units being provided on two sides of an opening end of the storage battery post connecting unit, and a cable connecting unit being provided in another opening end of the storage battery post connecting unit; and
   a gland comprising a pressing unit and a first and second rotating units provided on the pressing unit,
   wherein the first and second compressible units are rotatably connected to the first and second rotating units, and the first rotating unit is provided with a locking unit, which is located outside the first compressible unit;
   wherein the gland is externally provided with a protective cover adapted to the pressing unit, and the protective cover is fixedly connected to the gland;
   when the gland is rotated toward the terminal, the locking unit locks the terminal with a storage battery post by compressing the compressible unit; and
   a stop unit is provided outside the second compressible unit and protrudes from an outer side surface of the storage battery post connecting unit towards the second rotating unit, the stop unit and the locking unit are disposed on opposite sides, and when the gland is rotated, the second rotating unit abuts against a side of the stop unit that faces away from the storage battery post connecting unit to form a limiting fit between the stop unit and the second rotating unit, to prevent the gland from being in contact with the storage battery post.

2. The storage battery bolt terminal according to claim 1, wherein a position where the locking unit contacts the compressible unit is a transition corner, by which the opening between the first and second compressible units is gradually narrowed by compressing.

3. The storage battery bolt terminal according to claim 1, wherein the protective cover is made of a flame retardant hard material.

4. The storage battery bolt terminal according to claim 1, wherein the terminal is integrally formed.

5. The storage battery bolt terminal according to claim 1, wherein the gland is integrally formed.

6. The storage battery bolt terminal according to claim 1, wherein the pressing unit is of any circular or polygonal shape.

7. The storage battery bolt terminal according to claim 6, wherein the pressing unit is of rectangular shape.

8. The storage battery bolt terminal according to claim 7, wherein the cable connecting unit comprises at least one wiring hole, and a direction of the wiring hole is adjusted according to an outgoing line direction.

9. The storage battery bolt terminal according to claim 8, wherein an adjustment range of the direction of the wiring hole is 0° to 180° on a horizontal plane (XY) where the cable connecting unit is located, and/or 0° to 180° on a vertical plane (YZ) where the cable connecting unit is located.

10. The storage battery bolt terminal according to claim 8, wherein the cable connecting unit is connected to a cable by crimping, welding or screwing.

11. The storage battery bolt terminal according to claim 10, wherein the first and second compressible units are hinged to the first and second rotating units by a rotating shaft.

* * * * *